(12) United States Patent
Deb et al.

(10) Patent No.: US 6,795,799 B2
(45) Date of Patent: Sep. 21, 2004

(54) REMOTE DIAGNOSIS SERVER

(75) Inventors: Somnath Deb, Glastonbury, CT (US); Sudipto Ghoshal, Vernon, CT (US); Venkata N. Malepati, Newington, CT (US); David L. Kleinman, Carmel, CA (US); Kevin F. Cavanaugh, Glastonbury, CT (US)

(73) Assignee: Qualtech Systems, Inc., Whethersfield, CT (US)

( * ) Notice: Subject to any disclaimer, the term of this patent is extended or adjusted under 35 U.S.C. 154(b) by 35 days.

(21) Appl. No.: 10/062,704

(22) Filed: Jan. 31, 2002

(65) Prior Publication Data

US 2002/0161555 A1 Oct. 31, 2002

Related U.S. Application Data

(60) Provisional application No. 60/273,906, filed on Mar. 7, 2001.

(51) Int. Cl.[7] .......................... G06F 19/00; G06F 11/30
(52) U.S. Cl. ........................ 702/188; 702/183; 706/914
(58) Field of Search ............................... 702/182, 183, 702/184, 185, 188; 340/500, 517, 635; 700/108, 90; 706/911, 914, 915

(56) References Cited

U.S. PATENT DOCUMENTS

| | | | | |
|---|---|---|---|---|
| 5,963,884 A | * | 10/1999 | Billington et al. | 702/56 |
| 5,995,916 A | * | 11/1999 | Nixon et al. | 702/182 |
| 6,006,171 A | * | 12/1999 | Vines et al. | 702/184 |
| 6,041,287 A | * | 3/2000 | Dister et al. | 702/182 |
| 6,138,078 A | * | 10/2000 | Canada et al. | 702/44 |
| 6,192,325 B1 | * | 2/2001 | Piety et al. | 702/184 |
| 6,199,018 B1 | * | 3/2001 | Quist et al. | 702/34 |
| 6,262,550 B1 | * | 7/2001 | Kliman et al. | 318/565 |
| 6,298,377 B1 | * | 10/2001 | Hartikainen et al. | 709/223 |
| 6,330,525 B1 | * | 12/2001 | Hays et al. | 702/183 |
| 6,553,336 B1 | * | 4/2003 | Johnson et al. | 702/188 |
| 6,594,621 B1 | * | 7/2003 | Meeker | 702/185 |
| 2002/0035447 A1 | * | 3/2002 | Takahashi et al. | 702/188 |
| 2002/0077711 A1 | * | 6/2002 | Nixon et al. | 700/51 |
| 2002/0123864 A1 | * | 9/2002 | Eryurek et al. | 702/188 |
| 2002/0169514 A1 | * | 11/2002 | Eryurek et al. | 700/110 |
| 2003/0028268 A1 | * | 2/2003 | Eryurek et al. | 700/73 |

OTHER PUBLICATIONS

Deb et al, "Tele-diagnosis: remote monitoring of large-scale systems", IEEE, Mar. 18, 2000.*

Deb et al., "Remote Diagnosis Server", IEEE Oct. 7, 2000.*

Ghoshal et al., "An Integrated process for system maintenance, fault diagnosis and support", IEEE, Mar. 6, 1999.*

(List continued on next page.)

*Primary Examiner*—Patrick J Assouad
(74) *Attorney, Agent, or Firm*—McCormick, Paulding & Huber LLP

(57) ABSTRACT

A network-based diagnosis server for monitoring and diagnosing a system, the server being remote from the system it is observing, comprises a sensor for generating signals indicative of a characteristic of a component of the system, a network-interfaced sensor agent coupled to the sensor for receiving signals therefrom, a broker module coupled to the network for sending signals to and receiving signals from the sensor agent, a handler application connected to the broker module for transmitting signals to and receiving signals therefrom, a reasoner application in communication with the handler application for processing, and responding to signals received from the handler application, wherein the sensor agent, broker module, handler application, and reasoner applications operate simultaneously relative to each other, such that the present invention diagnosis server performs continuous monitoring and diagnosing of said components of the system in real time. The diagnosis server is readily adaptable to various different systems.

21 Claims, 6 Drawing Sheets

OTHER PUBLICATIONS

Deb et al., "Tele–diagnosis: Remote Monitoring of Large–Scale Systems", IEEE Mar. 18, 2000, Proceedings of IEEE Aerospace Conference, Big Sky, Montana, Mar. 18–25, 2000.

Deb et al, "Remote Diagnosis Server", IEEE, Oct. 7, 2000, Invited paper at the 19th Digital Avionics Conference,(IEEE AIAA), Philadelphia, PA, Oct. 7–13,2000.

Ghoshal et al, "An Integrated Process for System Maintenance, Fault Diagnosis and Supprt", IEEE, Mar. 6, 1999, Proceedings of IEEE Aerospace Conference, Aspen, Colorado, Mar. 6–13, 1999.

Deb et al, "De–Centralized Real–Time Monitoring and Diagnosis", Proceedings of IEEE SMC 1998.

* cited by examiner

REMOTE DIAGNOSIS SERVER

CROSS-REFERENCE TO RELATED APPLICATIONS

This application claims priority of U.S. Provisional Application No. 60/273,906 filed on Mar. 7, 2001 entitled Remote Diagnosis Server by Deb et al. Said provisional patent application is incorporated herein by reference.

This invention was made with United States Government support under contract number NAS2-99049 awarded by NASA. The United States Government has certain rights in the invention.

FIELD OF THE INVENTION

The present invention relates to monitoring framework, and more specifically to a distributed diagnosis architecture for remote monitoring, diagnosis, and maintenance of systems having multiple components, each component having sensors for monitoring and generating signals indicative of a characteristic of the component.

BACKGROUND

High rise buildings, nuclear power plants, manufacturing facilities, etc. generally employ a plurality of highly connected network enabled systems. For example, heating and air conditioning systems, fire prevention systems, alarm systems, security systems and many other systems and subsystems thereof perform various functions in these structures and facilities as well as in many other applications. Often, systems such as those identified above, perform critical functions and need to be closely monitored to ensure the efficient and safe operation of the facility or larger system. Systems such as those identified above, as well as others, could benefit from continuous monitoring for performance and maintenance reasons. Typically, systems such as these consist of embedded sensors and are network enabled allowing for the transmission of data to central (or remote) monitoring stations. Many of these systems are sensor rich, that is they employ numerous sensors for monitoring and generating signals indicative of a characteristic of the system, subsystem or component thereof.

Often, the structure, facility or larger systems lack the capability of monitoring the various systems and subsystems employed thereby. For example, various systems such as elevator systems, copy machines, automobiles, etc. employ many subsystems comprising sensors capable of transmitting signals for the purpose of performance monitoring and maintenance. However, many of these type of systems, or components thereof, as well as others, are usually not monitored and maintained remotely over a network.

Many such systems could benefit from a diagnosis server capable of processing data-streams from multiple components thereof by remote devices for the purpose of diagnosis and prognosis of the system or components thereof. Implementation of such a remote networked enabled device for monitoring the many systems and subsystems employed by facilities or large systems is significantly more cost effective than embedding devices capable of monitoring the performance of these systems within each of the structures or large systems.

In an increasingly connected world, it is not hard to imagine systems ranging from household appliances to sophisticated aircraft systems or large office complexes being continuously monitored or routinely connected to remote devices for services such as evaluation, diagnosis and maintenance of the systems and subsystems employed thereby.

SUMMARY OF THE INVENTION

Accordingly, a framework and architecture for remotely monitoring, diagnosing and maintaining a system having multiple components or subsystems thereof is disclosed.

The invention, in one aspect, discloses a diagnosis server and method that provides for continuous and remote monitoring and transmittal of sensor generated signals to networked logical reasoner applications which process the signals and provide diagnosis, failure detection, responsive signals and user output for the purpose of monitoring and maintaining systems of various complexity in real-time using applications remote from the system being monitored. The diagnosis server provides user-interactive reasoner applications for user controlled monitoring, diagnosing and maintaining of the system being monitored. Additionally, the present invention is designed to utilize prior art and future diagnostic applications for analysis and modeling of sensor signals providing efficient and accurate diagnosis and prognosis of a systems performance and identifying system failures and the potential therefor. The diagnosis server enhances preventive maintenance programs and reduces the number of unscheduled repairs for systems of various complexity in a wide range of industries.

The present invention network-based diagnosis server comprises an architecture such that the diagnostic reasoner applications and system specific knowledge are clearly separated. The latter includes database stored information comprising specifications and diagnostic information specific to the system being monitored as well as models of the system. Also, the diagnosis server provides signal processing and handling applications independent of the logical and user-interactive reasoner applications. These design features allow the diagnosis server to be truly distributed and readily adaptable to various different systems.

Based on the foregoing, it is a general object of the present invention to provide a method and apparatus for remotely monitoring, diagnosing and maintaining a system having multiple components or subsystem thereof.

One advantage of the invention is to reduce system down time by providing continuous and automatic analysis of the performance of individual components of the system being monitored and to identify and isolate faulty parts immediately upon failure, or before failure, enabling maintenance personnel to reduce or eliminate time spent troubleshooting failures in the system.

Another advantage of the invention is that it provides a distributed network-based diagnosis server for monitoring and diagnosing a system having logical reasoner applications, signal handler applications and signal broker module each as separate entities which can function on separate and distinct computers. The use of separate and distinct networked applications serves to enhance the scalability of the diagnosis server and the overall performance thereof as well as the convenience and practicality of using a diagnosis server networked for use by multiple users in multiple remote locations using multiple computers.

Another advantage of the invention is that it provides a diagnosis server for remote continuous monitoring and transmittal of sensor generated signals, to logical reasoner applications which process the signals and provide analysis, diagnosis, detection and isolation of system component failures and maintenance of systems of various complexity in real-time from a network remote to the system.

Thus, the present invention real-time diagnosis server and method promotes safety and efficiency in the operation of systems by providing continuous and accurate monitoring, diagnosing, and maintaining of complex systems. Furthermore, the invention reduces the operation costs of complex systems by identifying failures as they happen or potential failures prior to happening which can greatly reduce the time and expense of manual diagnosis and identification of system failures.

The above and other objects and advantages are satisfied by the invention which is a networked-based diagnosis server and method for monitoring and diagnosing a system having multiple components. The diagnosis server being remote from the system being observed.

The network-based diagnosis server comprises at least one sensor for monitoring and generating signals indicative of at least one characteristic of a component of the system, at least one sensor agent coupled to the sensor for receiving signals or messages therefrom, an interface connecting the sensor agent to the network, and a broker module coupled to the network for sending messages to and receiving messages from the sensor agent. The diagnosis server further comprises at least one handler application initiated by and connected to the broker module for transmitting messages to and receiving messages from the broker module and at least one reasoner application in communication with and invocable by the handler application for processing, and responding to messages received from the handler application. The handler application can include observer applications for monitoring the signals being sent and received by the broker module.

The following applications: sensor agents, broker module, handler and reasoner applications operate simultaneously relative to each other providing real-time monitoring and diagnosing of the system being observed. The broker module is independent of the handler applications and reasoner applications such that the diagnosis server is readily adaptable to various systems. Thus, the diagnosis reasoner of the present invention provides continuous monitoring and diagnosing of multiple components of the system in real-time.

The preferred embodiment of the invention comprises at least one reasoner application having a user interface for user controlled processing and responding to messages received from the handler application. The user interface allows the user to update the database as necessary with current information for the particular system.

Alternatively, the diagnosis server can maintain a system in conjunction with the monitoring thereof wherein the component of the system includes a controller coupled directly to the signal agent of the diagnosis server for receiving signals generated by the supervisor reasoner for controlling the component of the system. The control signals are transmitted to the controller via the signal agent.

The present invention diagnosis server provides real-time monitoring and diagnosing of the system it is observing by continuously processing and responding to periodic messages transmitted to the signal agent of the diagnosis server by the sensors which monitor the components of the system and generate test results or signals indicative of at least one characteristic of a component the system. Typically the sensors may generate and transmit periodic signals in the range of every one to two seconds. The signals transmitted by the sensors are subsequently received, processed and responded to by the diagnosis server such that the system is monitored, diagnosed and maintains the system continuously and in real-time. The invention provides a diagnostic server that is built on a three-tier architecture having a client layer consisting of the sensors and sensor agent applications. The sensor agent applications receive signals from the sensors, condition the signals and transmit them over a network to the broker module.

The middle layer consists of the broker and handler applications for transmittal of the sensor signals to the appropriate reasoner applications. The broker also performs session management, flow control, management of shared memory, message buffering and routing, and computational load balancing.

The third layer, the "back-end" consists of multiple on-line and user-interactive reasoner applications and accessible databases for processing signals received from the handler applications, diagnosing the status of the components of the system as well as detecting failures in the system.

The diagnosis server of the present invention functions on computers networked through the Internet, Local Area Network (LAN), or other Transmission Control Protocol/Internet Protocol (TCP/IP) network.

The three-tier architecture provides for efficient monitoring of systems of various complexity, such that a 50 MHz processor can support tens of concurrent sessions involving hundreds of tests. The solution scales to hundreds of sessions in any modern workstation or server.

The above stated performance results for the present invention diagnosis server are derived from the applicant's testing of the broker module, an RT-Agent handler application and a TEAMS-RT logical reasoner application on a Sun SS20/502 system with 50 Mhz Super SPARC processor and 224 Mb of RAM. (The RT-Agent handler application and TEAMS-RT logical reasoner application are identified below.) A slow computer was used for testing purposes for the diagnosis server because the timer routine results were unreliable in the sub-ms range such that the run time for the diagnosis server could not be accurately measured using the faster processors. The sensor agent client applications were run on both Sun and Windows NT PCs with various hardware configurations. A web-server was also used to serve the monitoring console on the Sun SS20 system. The test results shown in Table 1 following, confirm that using the distributed architecture disclosed herein, the SS20/502 can provide remote diagnosis capability to hundreds of clients, as the reasoners are run on faster remote computers. Results from other tests of the present invention diagnosis server are available in the papers entitled "Tele-Diagnosis: Remote monitoring of large-scale systems" Mar. 15, 2000, Deb, Ghoshal, Malepati, Kleinman, all of Qualtech Systems, Inc., 100 Great Meadow Road, Suite 501, Wethersfield, Conn. 06109 and "Remote Diagnosis Server", Oct. 7, 2000, Deb, Ghoshal, Malepati, Cavanaugh, all of Qualtech Systems, Inc., 100 Great Meadow Road, Suite 501, Wethersfield, Conn. 06109. The above-identified articles are incorporated herein by reference.

TABLE 1

Simulation results for 7 different models of varied complexity

| Model | Number of Tests Pass/Fail | Number of Faults Inserted/ Total Modeled | RT-Agent CPU Run Time in ms New/Old | Broker CPU Run Time in ms | TEAMS-RT CPU Run Time in ms |
|---|---|---|---|---|---|
| 1553 | 59/2 | 2/174 | 55/250 | 10 | <5 |
| Transmission system | 46/5 | 2/160 | 49/210 | 9 | <5 |
| EEATCS | 9/134 | 2/78 | 55/250 | 12 | <5 |
| Documatch | 175/5 | 2/259 | 60/230 | 7 | <5 |
| LO2 | 329/39 | 3/167 | 80/300 | 7 | <5 |
| Engine System | 274/32 | 3/255 | 75/300 | 7 | <10 |
| LGCU-WRA | 1003/316 | 4/2080 | 250/500 | 12 | <250 |

The preferred embodiments of the invention utilize prior art TEAMS-RT logical reasoners developed by Qualtech Systems, Incorporated, located at 100 Great Meadow Road, Suite 501, Wethersfield, Conn. 06109. The TEAMS-RT reasoner application is described in detail in "De-centralized Real-time Monitoring and Diagnosis", Deb, S., Mathur, A., Willet, P., and Pattipati, K. R., the paper is available at the Qualtech Systems, Incorporated website and incorporated herein by reference.

The key features of the TEAMS-RT reasoner are the following: 1) separation of system specific information, represented in terms of models, from the fault-isolation methods. This allows for the same reasoner application to be used on multiple systems using different models; 2) ability to diagnose multiple failures in fault-tolerant systems with multiple modes of operation; and 3) excellent performance using low-end microprocessors.

The TEAMS-RT reasoner is therefore ideal for real-time diagnosing and monitoring of various systems. It is currently used for monitoring systems as diverse as helicopter engines and transmissions to bus systems in the International Space Station. However, embedding additional software in existing systems can introduce safety and validation concerns, especially in applications involving aircraft or the aerospace industry. Therefore the present invention diagnosis server designed to operate remote from the system being monitored is especially advantageous for these and many other applications.

The preferred embodiment of the invention further comprises prior art TEAMATE, user-interactive reasoners also developed by Qualtech Systems, Incorporated. The TEAMATE reasoner is based on Qualtech Systems, Incorporated, TEAMATE tool, which is an adaptive, intelligent diagnostic engine for field (offline) maintenance. The TEAMATE reasoner application provides network based adaptive and interactive diagnosis and is described in detail in the article "An Integrated Process for System Maintenance, Fault Diagnosis and Support", Ghoshal, S., Shrestha, R, Ghoshal, A., Malepati, V., Deb, S., and Pattipati, K., also available at www.teamqsi.com/rds and incorporated herein by reference.

The TEAMATE reasoner as used with the present invention is of great value to a field technician as it allows him to conduct the diagnosis on a local system and access through the diagnosis server information and models that fit the specific system being diagnosed. The diagnosis server allows for data and Interactive Electronic Technical Manuals (IETMs) to be readily accessible and kept safe and secure as opposed to hard copy information and manuals.

The preferred embodiment of the invention also includes the TEAMS-KB diagnostic database. The TEAMS-KB diagnostic database is a product of Qualtech Systems, Incorporated, (QSI). TEAMS-KB stands for Testability Engineering and Maintenance System-Knowledge Base and is a companion tool to other QSI tools. TEAMS-KB is a member of QSI's Integrated Tool Set and serves as a model management and maintenance data collection tool that can be deployed at various maintenance sites. It is used for model management, scheduled and unscheduled maintenance, diagnostics data collection, statistical data analysis, and data mining for trend and anomaly detection/isolation.

Features of TEAMS-KB include the management of diagnostic models and the service of diagnostic and health status information for onboard and ground-based fault isolation and troubleshooting tools. The efficiency of the reasoning engines behind these tools depend on parameters such as the failure rate of components, costs and time required for performing diagnostic tests, error likelihood of test outcomes, and accurate dependency information relating faults to failures, symptoms, and anomalies. The updating of such parameters using mined output of historical data collected from various fleets would greatly contribute to efficient maintenance by reducing time to troubleshoot and repair, and increasing availability.

TEAMS-KB can collect data automatically from TEAMATE, which eliminates the delays and errors of manual data collection. The on-line diagnostic and maintenance information collected by TEAMATE (components repaired, repair times/costs, test times/costs, etc.) can be archived by TEAMS-KB. TEAMS-KB provides an important link to the integrated diagnostic process. TEAMS-KB includes various parameter estimation algorithms for the analysis of maintenance data. It can be used to refine a system model residing in the knowledge base of TEAMS by updating repair costs, repair times, component failure rates and diagnostic costs and times. Additionally, TEAMS-KB can be utilized efficiently at maintenance sites as the analysis algorithms included can provide predictions of optimal shelf-stocks of spares and parts requirements as well as other information. The reports generated by TEAMS-KB can provide insight into operations, which slow down the entire maintenance process by pinpointing unreasonably long task times, repeated failures of certain components, and updating hazard rates of components caused by changing environmental conditions.

TEAMS-KB can automate scheduled and non-scheduled maintenance on a wide range of systems including manufacturing equipment and vehicles. TEAMS-KB can also be used to generate work orders, track maintenance and parts history, and create maintenance reports. Using TEAMS-KB, one can quickly review maintenance schedules or automatically generate work orders therefor. Additionally TEAMS-KB provides a means to efficiently track numerous business and maintenance related costs and activities such as equipment or facility repair or maintenance costs, labor costs, equipment history or performance records, employee performance records, work orders, and repair times.

The TEAMS-KB diagnostic database provides model management and diagnostic data management as its principal features. Model management includes the capability to create and modify models and components that comprise the model. The TEAMS-KB diagnostic database application can manage models, test models and provide an integrated environment for model development. Diagnostic data management includes capturing and managing diagnostic test and session history logs, managing schedules, and tracking and predicting spare part requirements.

DETAILED DESCRPTION OF THE PREFERRED EMBODIMENTS

A detailed description of the preferred embodiment of the invention follows. It is to be understood that the disclosed embodiments are merely exemplary of the invention, which may be embodied in various forms. Therefore, specific structural and functional details disclosed are not to be interpreted as limiting, but rather as a representative basis for teaching one skilled in the art to variously employ the present invention in virtually any appropriately detailed system or structure. It should be understood that the drawings included herewith represent preferred embodiments of the invention only and are included to facilitate an understanding of the invention and not to limit the scope thereof.

The present invention relates to monitoring framework, and more specifically to a distributed diagnosis architecture for remote monitoring, diagnosing, and maintaining systems having multiple components, each component having sensors for monitoring and generating signals indicative of a characteristic of the component.

Figure 1:
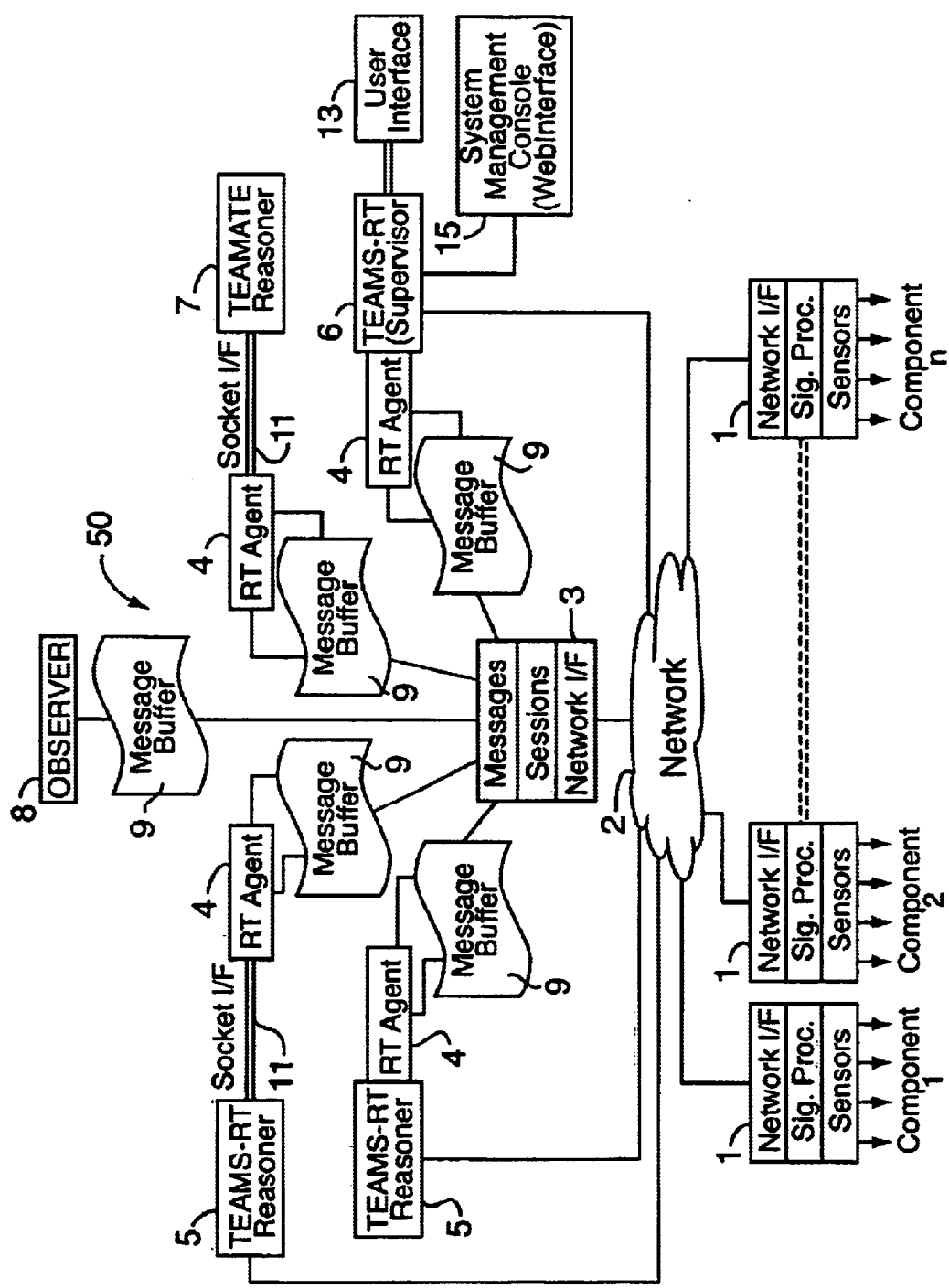
FIG. 1 is a diagram of the diagnosis server of the present invention.

Referring to the drawings, wherein like numerals represent like parts throughout the several views, the diagnosis server of the present invention, generally 50 in FIG. 1 comprises sensor agents 1, coupled to n components of the system being monitored. Sensor agents 1 are coupled to a network 2. Broker module 3 is coupled to network 2 and handler applications 4 via shared memory 9. In the embodiment shown in FIG. 1, the handler applications are shown as RT-Agent applications. The handler applications 4 are coupled to the broker module 3 via shared memory 9 and to logical reasoners 5, user-interactive reasoners 7 and supervisor reasoners 6. In the embodiment shown in FIG. 1, the logical reasoners 5 are TEAMS-RT reasoners, the user-interactive reasoners, 7 are TEAMATE reasoner applications and the supervisor reasoner application is a Supervisor TEAMS-RT reasoner. Referring again to the FIG. 1 embodiment, the supervisor application is coupled to a user interface 13 and a System Management Console 15. System Management Console 15 is a user-interfaced network accessible database for storing information and diagnostic material specific to the system being monitored.

Also shown in FIG. 1 is observer application 8 coupled to broker module 3 via shared memory 9 for observing signal transmissions to and from broker module 3. Observer application 8 can be used to determine the performance of the diagnosis server as well as other purposes.

Following, each application of the diagnosis server will be described in detail including their functions and the relationships therebetween.

Referring again to FIG. 1 sensor agent 1 is coupled to network 2 and when initiated, transmits a signal to broker module 3 via network 2 to identify the component of the system it is monitoring. Broker module 3, coupled to network 2 and shared memory 9, invokes a handler application 4 and transmits the sensor signal to a designated segment in shared memory 9. Handler application 4 is coupled to shared memory 9 as well as reasoner applications 5. (The FIG. 1 embodiment of the diagnosis server identifies handler applications 4 as RT-Agents described above.) Handler application 4 periodically accesses said designated shared memory segment for signals, and if a signal is identified, determines which logical reasoner 5, user-interactive reasoner 7, or supervisor reasoner 6 to invoke based on the component information transmitted by sensor agent 1. Handler application 4 then initiates said appropriate reasoner application and transmits said sensor signal thereto. Handler application 4 subsequently transmits a signal to broker module 3 confirming successful initialization of a proper reasoner application and transmission of the sensor signal thereto. Broker module 3 then transmits to sensor agent 1 a signal containing a session identification and confirming successful initialization of said appropriate reasoner application 5, user-interactive reasoner 6, or supervisor reasoner 7. (Note, in the FIG. 1 embodiment, reasoner applications 5, user-interactive reasoner application 7 and supervisor reasoner 6 are identified as TEAMS-RT reasoner, TEAMATE reasoner and Supervisor TEAMS-RT reasoner respectively.) Each of these applications are utilized in the preferred embodiment and are described above.)

Initialization of sensor agent 1, includes transmission to broker module 3 via network 2, data including identification of the particular sensors it is monitoring, sensor rates and timing information, system mode information, as well as system data to be transmitted to the appropriate reasoner or supervisor reasoner application.

During normal operation of diagnosis server 50, sensor agent 1 periodically transmits signals to broker module 3 via network 2 indicative of the status of the component it is monitoring. Sensor agent 1 may perform pass/fail tests on the signal data received from the sensors prior to transmitting said signals to broker module 3. Sensor agent 1 can also utilize signal conditioning and event compression algorithms to minimize transmissions of repetitive test results to broker module 3, and transmit only changes in test outcomes or status data to broker module 3 if no changes have occurred since previous transmission. Alternately, sensor agent 1 can transmit raw sensor signals to broker module 3 for subsequent processing by said reasoner applications.

Sensor agent 1 coordinates signal transmissions with broker module 3 via network 2 by initiating signals to broker module 3 or responding to signals received from broker module 3 using flags corresponding to: START, STOP, SUSPEND, RESUME, or the like.

Sensor agent 1 can also receive signals directly from supervisor reasoner applications 6 via network 2, wherein sensor agent 1 transmits said signals to a controller of the component of the system it is monitoring for control and maintenance of the component of the system by supervisor reasoner 6 of diagnosis server 50.

As diagramed in FIG. 1, broker module 3 receives signals from and transmits signals to sensor agents 1 directly via network 2. Broker module 3 receives signals from and transmits signals to reasonser applications 5 via shared memory 9 and handler applications 4. Broker module 3 can also receive signals from and transmit signals to supervisor reasoner application 6 and user-interactive reasoner applications 7 via network 2, shared memory 9 and handler applications 4. Broker module 3 allocates and manages shared memory 9 for storing the current status and history of each component of the system. Shared memory 9 is also accessed by broker module 3 for storing signals transmitted to broker module 3 for distribution to other applications and for retrieving signals destined for broker module 3 stored in shared memory 9 by other applications. Broker module 3 enforces access privileges to said shared memory 9 and can allocate or reclaim said shared memory 9 as required. Broker module 3 is responsible for distributing and balancing computational load within diagnosis server 50 by invoking handler applications 4 on remote computers as necessary based on the number of signals received from said sensor agents 1 and reasoner applications 5, user-interactive reasoner applications 7 and supervisor reasoner applications 6. The content of signals are transparent to broker module 3 unless, the particular signal is one wherein broker module 3 is itself identified as a handler application 4 or observer application 8. Transmission of transparent signals by broker module 3 increases the efficiency of diagnosis server 50 during the operation thereof and facilitates the adaptability of the diagnosis server to various systems.

In the preferred embodiment broker module 3 transmits all signals to said handler applications 4 by storing same in a segment of shared memory 9 designated for retrieval by said handler application 4. Likewise, handler applications 4 transmit signals to said broker module 3 by updating or storing in said designated segments of shared memory 9 responsive signals for subsequent retrieval by said broker module 3. Therefore, in the preferred embodiment, all signals designated for said handler application 4 generated by said broker module 3 and all signals designated for said broker module 3 generated by said handler application 4 are buffered via shared memory 9. In other embodiments of the present invention, broker module 3 transmits signals directly to and receives signals directly from handler applications 4.

Accordingly, Broker module 3 performs the following:

1) Receives signals initiated by sensor agents 1, wherein sensor agents 1 transmit raw sensor signals or conditioned sensor signals to said broker module 3;

2) Retrieves signals from shared memory 9 stored by handler applications 4, for subsequent transmittal of said signals to the designated sensor agent 1 or supervisor reasoner application 6.

3) Receives signals initiated by supervisor reasoner application 6 via shared memory 9 for subsequent transmittal of said signals to reasoner applications 5 or user-interactive reasoner applications 7 via shared memory 9 and handler applications 4 for purposes of managing said reasoner applications;

4) Allocate, attach, reclaim, and manage shared memory 9 based on session identifications, component identifications and history. Managing said shared memory 9 may include locking memory using semaphores to prevent write access by multiple applications;

5) Initiate and identify handler applications 4 and observer applications 8 as required based on sensor signals and data received from sensor agents 1;

6) Allocate sufficient said shared memory 9 and store copies of all signals received and transmitted in appropriate segments of shared memory 9;

7) Respond to, transmit, or distribute by storing in said appropriate segment of shared memory 9 all signals received from said sensor agents 1 and all signals retrieved from said shared memory 9;

8) Perform housekeeping tasks for said diagnosis server 50 such as clear buffers, free shared memory 9 segments, etc.

Alternatively, broker module 3 can include a user interface for generating user output, wherein broker module 3 upon receipt or retrieval of a signal indicative of an error message, or other condition, generates and transmits signals indicative of the error or other condition directly to a user output device.

Referring again to FIG. 1, handler applications 4 function to separate broker module 3 from the reasoner applications, namely, reasoner applications 5, user-interactive reasoner applications 7 and supervisor reasoner applications 6. This allows diagnosis server 50 to be easily adapted to various systems while utilizing the same reasoner applications or other similar applications.

Handler applications 4 receive signals from broker module 3 via shared memory 9 by periodically accessing the appropriate segment of shared memory 9 and retrieving signals stored therein by broker module 3. Based on the signals retrieved, handler application 4 identifies, connects to, and invokes an appropriate reasoner application for transmittal of said signals thereto. Handler applications 4 also store response or command signals from attached reasoner applications 5, user-interactive reasoner applications 7 and supervisor reasoner applications 6 for subsequent retrieval of said signals by broker module 3 via shared memory 9. Handler applications 4 utilize network 2 for transmission and receipt of signals from remote applications. In some embodiments of the present invention, handler applications 4 receive signals from and transmit signals to broker module 3 directly or via network 2.

Figure 2:
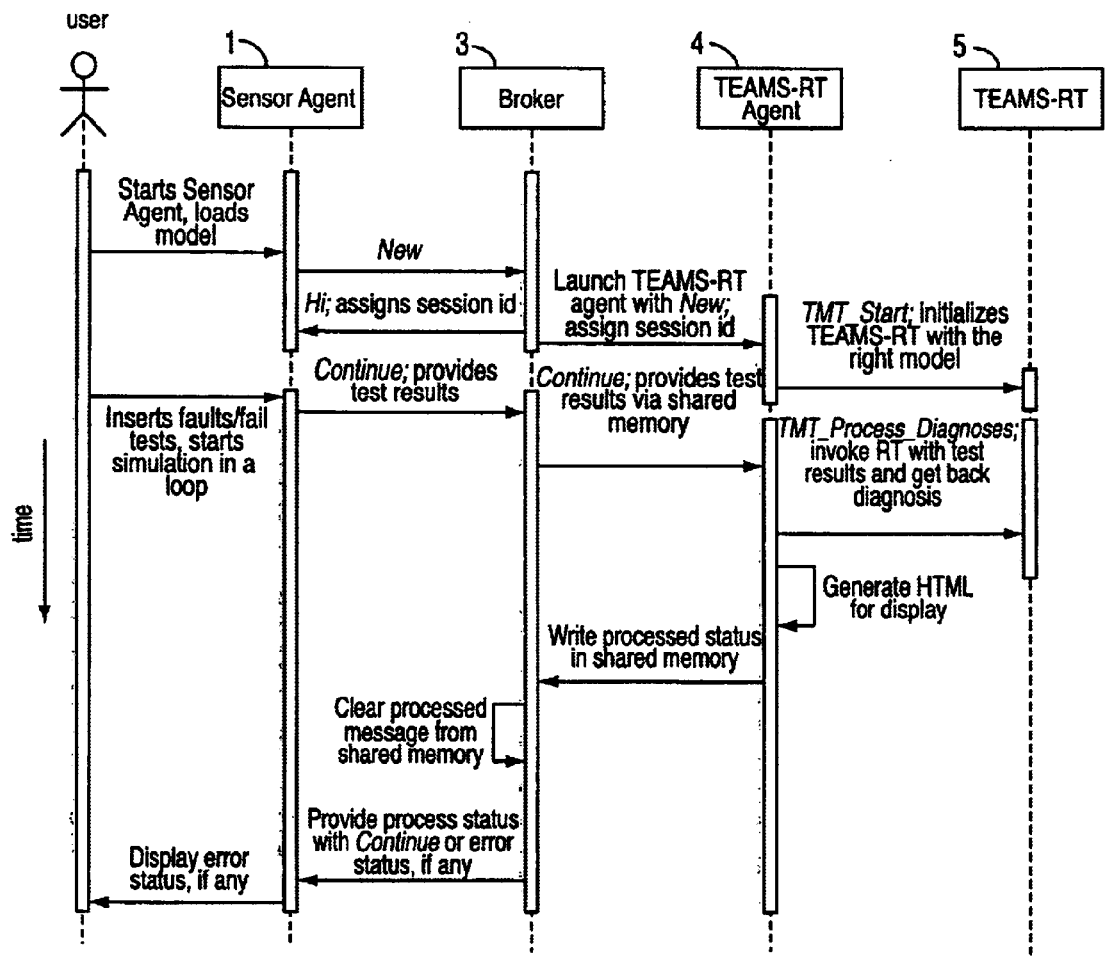
FIG. 2 is a UML sequence diagram showing the functional relationship between different applications of an embodiment of the invention.

Referring to FIG. 1 and UML sequence diagram, FIG. 2, handler applications 4 perform the following:

1) Upon initialization by broker module 3, handler applications 4 periodically accesses designated segments of shared memory 9 and retrieves signals stored therein for said handler application 4. Typically, every t seconds (where t is a predefined sampling interval based on sensor data rates, typically t=2 seconds), handler application 4 checks said designated shared memory 9 segment for sensor test result signals and command signals to process.

2) Upon retrieval of a signal from the shared memory 9 segment, and depending on the content of said signal, handler applications 4 identifies and invokes an appropriate reasoner application 5, user-interactive reasoner application 7 or supervisor reasoner application 6 and transmits said signal thereto for processing.

3) Upon successful initiation of a reasoner application, handler application 4, transmits via shared memory 9 responsive signals to broker module 3 identifying itself as handler application for a sensor client and confirming initiation and transmittal of said sensor signals to said reasoner application. Handler applications 4 communicate directly with said reasoner applications or via a socket interface 11 to said reasoner applications operating on remote computers within diagnosis server 50.

Upon completion of processing of said signals by reasoner application 5, user-interactive reasoner application 7 or supervisor reasoner application 6, responsive signals are transmitted from said reasoner application to said handler application 4 to be stored in the appropriate shared memory 9 segment for retrieval by said broker module 3. In the event of an error message or other condition, the broker module may transmit a signal to supervisor reasoner 6 for display to the user via user interface 13.

Handler applications 4 comprise means to access and lock said shared memory 9 and transmit signals to broker module 3 directly or flag said shared memory 9 segments when free to be reclaimed by broker module 3.

Referring again to FIG. 1, reasoner applications 5, upon initiation by said handler applications 4 and receipt of signal data therefrom, perform logical analysis of the sensor signals using algorithms, thereby diagnosing the state of the system component and determining the occurrence of component failures or the potential therefor. Reasoner applications 5 can request and receive signals from or transmit signals to other reasoner applications 5 via network 2 to coordinate analysis between components of the system or to determine the state of other associated components of the system. Reasoner applications 5 can also request and utilize system specific data or system modeling results from supervisor reasoner 6 by transmitting said requests to supervisor reasoner 6 via network 2. Supervisor reasoner application 6 responds directly to reasoner application 5 via network 2. Upon completion of a diagnosis session, reasoner application 5, transmits component status results or other responsive signals directly to handler applications 4 or via network 2, if said reasoner application 5 is remote from the handler application 4. Reasoner applications 5 can perform logical analysis for various systems using sensor data received from said handler applications 4 and system parameters requested and received from said supervisor reasoner application 6. Alternatively, reasoner applications 5 can be component or system specific and use predetermined parameters and algorithms to monitor and diagnosis failures for a specific component of the system.

Reasoner applications 5 are coupled to their specific handler application 4 as well as network 2 such that each reasoner application 5 can communicate with other reasoner applications 5 and supervisor reasoner application 6 to coordinate diagnosis of associated components of the system. Separation of the logical reasoner applications from broker module 3 and sensor agents 1, facilitates the adaptability and scalability of diagnosis reasoner 50 to a wide range of systems of varied complexity.

In the preferred embodiment, diagnosis server 50, diagramed in FIG. 1, reasoner applications 5 are TEAMS-RT reasoner applications, identified above.

Referring again to FIG. 1, user-interactive reasoner applications 7 can be initiated by either said handler applications 4, or directly by a user. User-interactive reasoner applications 7 perform monitoring and diagnosis of component systems by requesting component status data for user review of same. User-interactive reasoners 7 can utilize said supervisor reasoner 6 to obtain system and component specific information and data or system modeling results in the same way as reasoner applications 5 utilize supervisor reasoner 6 described above. User-interactive reasoner application 7 is coupled to handler application 4 and therefore transmits and receives signals via said handler application 4 and broker module 3.

In the preferred embodiment of diagnosis server 50, diagramed in FIG. 1, user-interactive reasoner applications 7 are TEAMATE reasoner applications, identified above.

Figure 3:
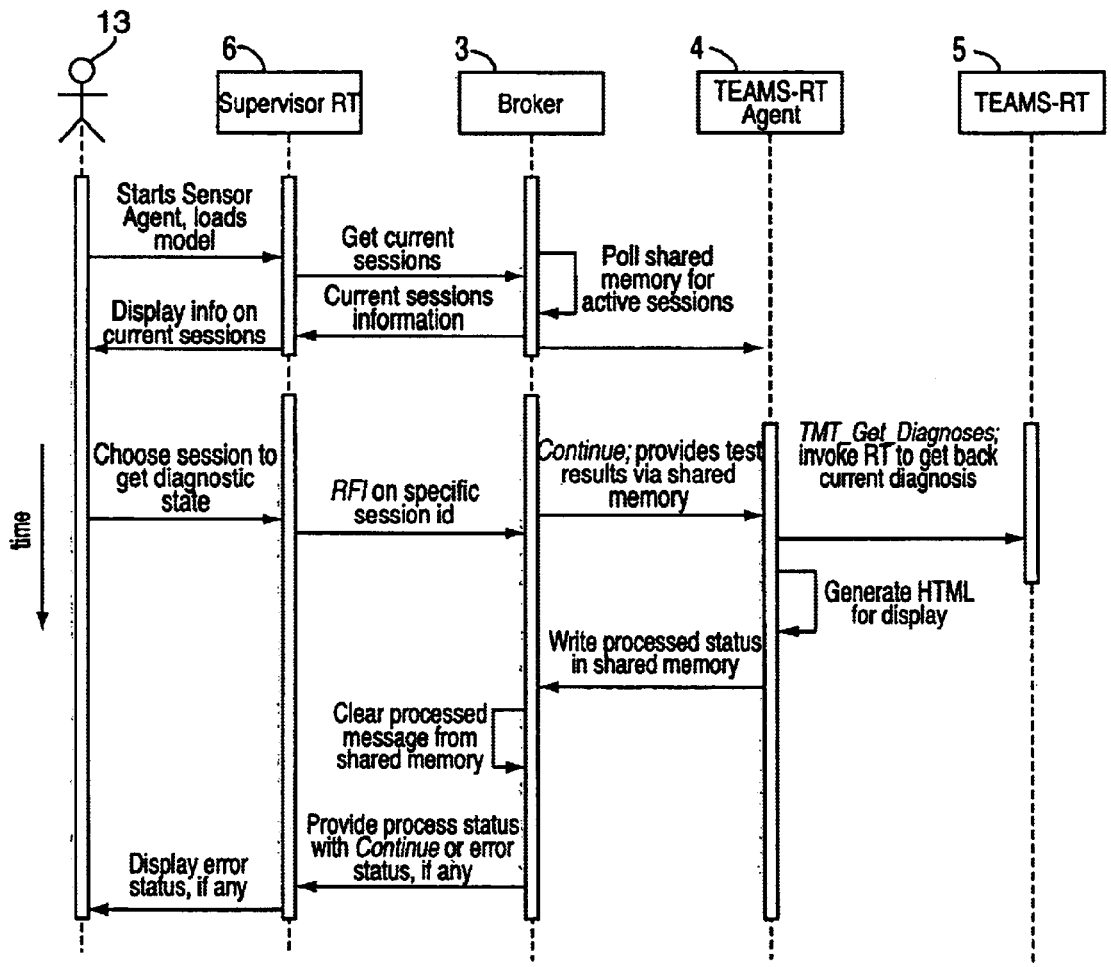
FIG. 3 is a UML sequence diagram showing the functional relationship between the Supervisor TEAMS-RT reasoner and other applications in the preferred embodiment.

Referring again to FIG. 1, supervisor reasoner application 6 has system wide global access to all other applications of the diagnosis server via a connection to network 2. Supervisor reasoner 6 is also coupled to a handler application 4 for receiving signals from and transmitting signals to broker module 3. Supervisor reasoner application 6 can provide diagnosis of the system or a component thereof, by combining the diagnosis results from one or more reasoner applications 5, using algorithms or other means. Alternatively, supervisor reasoner application 6 can "shadow monitor" reasoner application 5 for the purpose of monitoring the performance of diagnosis server 50 or to employ alternate algorithms for diagnosis purposes. Supervisor reasoner 6 has access to user-interfaced System Management Console 15 or other databases containing system specific information and diagnostic FIG. 3 is a UML sequence diagram showing the flow of signals from supervisor reasoner 6 to and from broker module 3 and user interface 13. FIG. 3 diagrams the flow of signals between the applications described herein.

Supervisor application 6 has access to retrieve and review any and all test results from all reasoner applications 5, and is installed as an observer process for all signals transmitted to and from said broker module 3. This allows supervisor application 6 to perform said "shadow" monitoring of all reasoner applications 5, sensor applications 1, and broker module 3. Supervisor application 6 can also generate command signals to be delivered to any reasoner application 5 via said handler application 4 and broker module 3. Such command signals may include: instructions to report intermediate diagnosis to supervisor; instructions to change the state of any component; and instructions for session management (for example, SUSPEND, RESUME, etc.). Alternatively supervisor reasoner 6 can transmit command signals directly, or via network 2, to all other reasoner applications. Supervisor reasoner 6 is coupled to one or more databases such as the System Management Console 15 shown in FIG. 1 which may contain component and system specific information or diagnostic tools. Supervisor reasoner 6 can access and retrieve said specific information for its own purposes or upon request, transmit said information to reasoner applications 5 or user-interactive reasoner applications 7. In the preferred embodiment of the present invention diagnosis server, supervisor reasoner 6 comprises a user-interface 13 for generating user output and receiving user requests. User-interface 13 allows users to query supervisor reasoner 6 as to the status of any component of the system or control said components of the system via said supervisor reasoner 6, sensor agents 1 and controllers system components as described above.

In the preferred embodiment, diagrammed in FIG. 1, diagnosis server 50, utilizes the Supervisor TEAMS-RT application described above for supervisor reasoner application 6.

Figure 4:
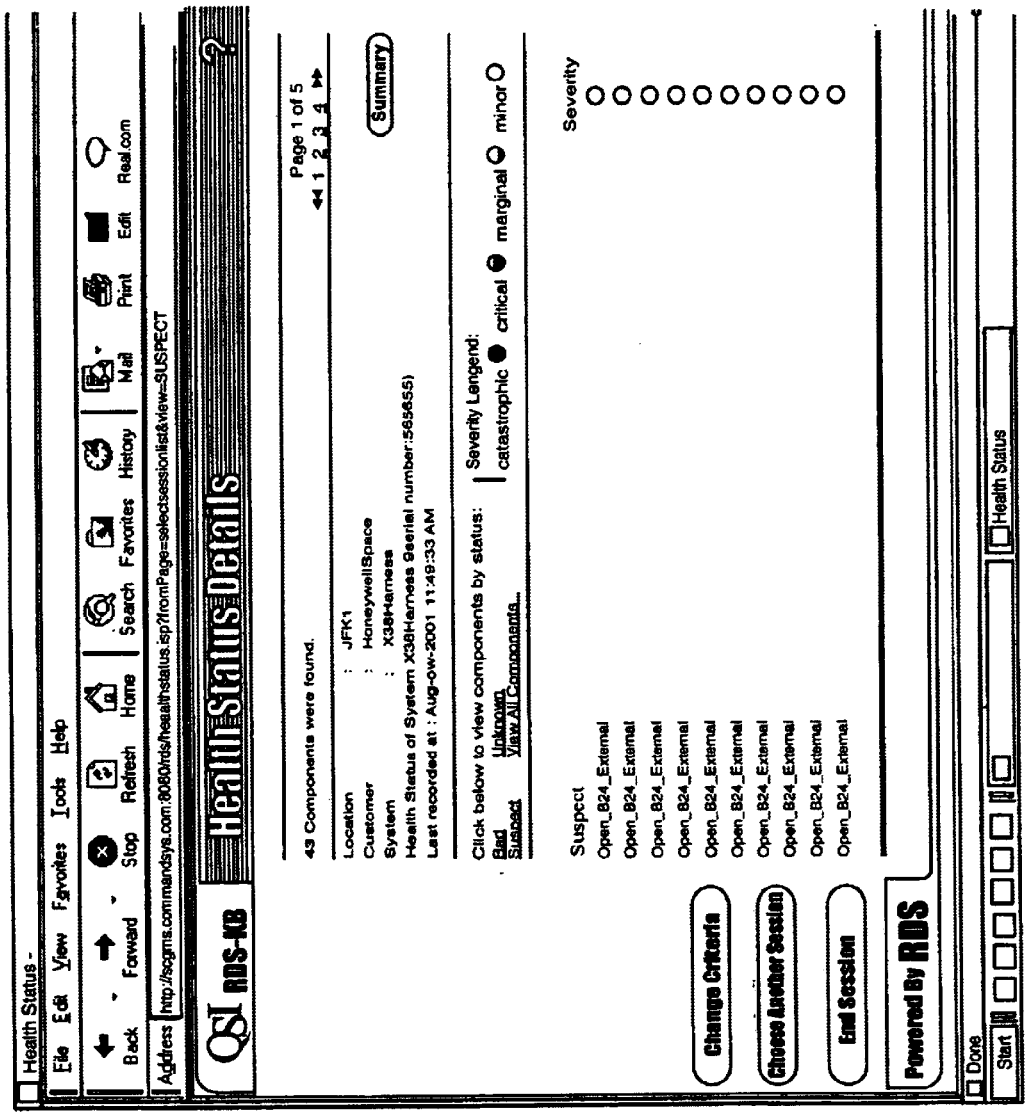
FIG. 4 shows a typical user output screen of the diagnosis server showing the status of some components of a system being observed.

FIG. 4 shows a sample user output screen describing in part the status of a portion of the system being observed.

Figure 5:
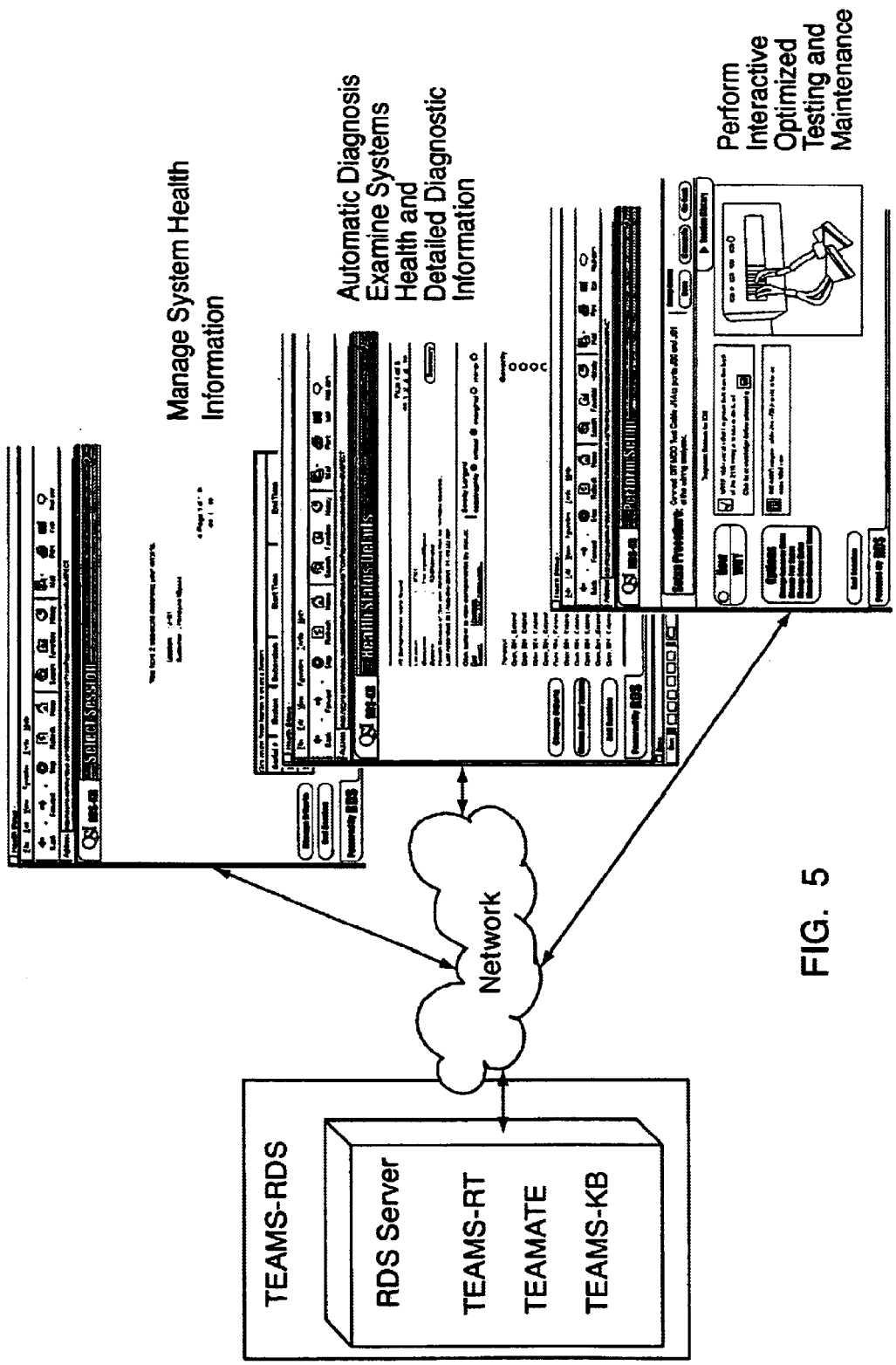
FIG. 5 is a diagram showing some of the integrated applications as used in the preferred embodiment of the present invention.
Figure 6:
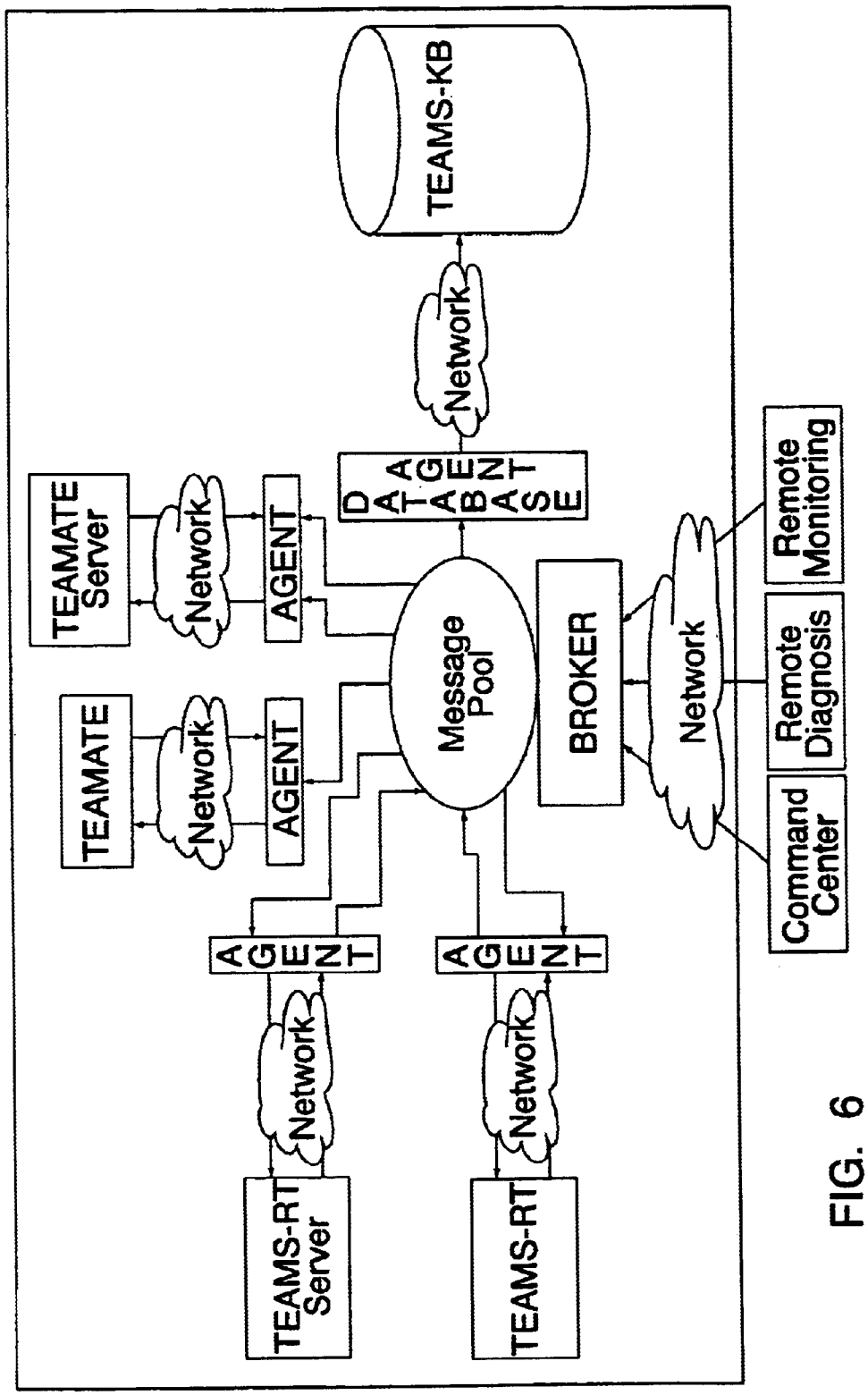
FIG. 6 is a diagram of the preferred embodiment of the present invention including the TEAMS-KB diagnostic database.

The preferred embodiment further comprises a TEAMS-KB diagnostic database application (identified above) for diagnosis and modeling of systems as well as storing field data and system history data. TEAMS-KB database contains sophisticated modeling and trend analysis applications for enhancing preventive maintenance programs as well as diagnostic testing and analysis to identify and isolate faults. The TEAMS-KB database is coupled to network 2 as shown in FIG. 5 and is accessible to all said reasoner applications via network 2.

All applications identified in the preferred embodiment herein utilize a modified ToolTalk® message service and ToolTalk® architecture for said signal transmissions to and from said applications and data structures. ToolTalk® is a trademarked product of Sun Microsystems Computer Corporation, of Mountain View, Calif. 94043.

The preferred embodiment of the diagnosis server described herein utilizes message passing. Each message includes the following for parsing purposes:

1) a header which includes source identification and optional destination identification; client type (ex. sensor agent, broker module, etc.); and a session identification.
2) a session command section, if present, including instructions such as START, STOP, SUSPEND, RESUME, RESET, EXIT, etc;
3) a diagnosis command section consisting of one or more instructions or commands such as, PROCESS_DATA, PEFORM_TEST, CHANGE_MODE, REPORT_DIAGNOSIS, etc. wherein each diagnosis command is paired with a message block. The message block contains data associated with the diagnosis command, such as Test name and number, Test outcome, Sensor data block, Fault name, Fault number, Fault status, etc.

A person skilled in the art will readily appreciate that the diagnosis server and method of the present invention can achieve monitoring, diagnosing and maintenance of complex systems using a network of remote applications and databases in real-time. The invention provides for continuous monitoring and concurrent diagnosis of hundreds of client sensors and accurate fault testing sessions in real-time.

It will be readily apparent to those skilled in the art that many modifications to the preferred embodiment of the present invention are possible without deviating from the scope and spirit of the present invention. Also understood is that the diagnosis server and method of the present invention can be adapted for use with any system having signal producing sensors.

The applicant has suggested that some of the many uses of the diagnosis server of the present invention are applications involving aerospace, power plants, business, military and industrial equipment as well as medical devices. One skilled in the art will recognize that there are many other applications wherein the present invention can be used as a diagnostic and maintenance tool.

Thus, while the present invention has been described with preferred embodiments thereof, it will be understood that many modifications will be readily apparent to those skilled in the art. Therefore, it is intended that this invention be limited only by the following claims and the equivalents thereof.

What is claimed is:

1. A network-based diagnosis server for remotely monitoring and diagnosing a system having multiple components, said diagnosis server comprising:

at least one sensor for monitoring and generating signals indicative of at least one characteristic of a component of the system;

at least one sensor agent coupled to said sensor for receiving signals therefrom;

an interface connecting said sensor agent to said network;

a broker module coupled to said network for sending signals to and receiving signals from said sensor agent;

at least one handler application initiated by and connected to said broker module for transmitting signals to and receiving signals therefrom;

at least one reasoner application in communication with and invocable by said handler application for processing, and responding to signals received from said handler application;

wherein said sensor agent, said broker module, said handler application, and said reasoner application operate simultaneously relative to each other;

said broker module being independent of said handler application and said reasoner application such that said diagnosis server is readily adaptable to various systems; and wherein said diagnosis server continuously monitors and diagnoses said components.

2. A network-based diagnosis server as defined in claim 1, wherein said reasoner application comprises at least one user-interactive reasoner application having a user interface for user controlled, processing and responding to signals received from said handler application.

3. A network-based diagnosis server as defined in claim 2 further comprising at least one supervisor reasoner application for managing said reasoner and said user-interactive reasoner applications, wherein said supervisor reasoner is in communication globally with said reasoner application, said user-interactive reasoner application, said broker module and said sensor agent.

4. A network-based diagnosis server as defined in claim 1, wherein said component of the system comprises a controller coupled to said signal agent, wherein said signal agent transmits signals thereto for controlling said component of the system.

5. A network-based diagnosis server as defined in claim 3 further comprising a user interfaced database coupled to said supervisor reasoner for accessible storage of diagnostic information specific to the system.

6. A network-based diagnosis server as defined in claim 1, wherein said reasoner application is a TEAMS-RT reasoner application.

7. A network-based diagnosis server as defined in claim 3, wherein said supervisor reasoner application is a Supervisor TEAMS-RT reasoner application.

8. A network-based diagnosis server as defined in claim 1, wherein said sensor agent periodically transmits signals to said broker module for subsequent processing by said reasoner application such that said diagnosis server operates in real-time.

9. A network-based diagnosis server as claimed in claim 1, wherein said handler application comprises at least one observer application for monitoring signals sent to and received by said broker module.

10. A network-based diagnosis server as claimed in claim 1, wherein said broker module is scalable for managing computational load of said server.

11. A network-based diagnosis server as claimed in claim 2 further comprising shared memory allocated by said broker module and coupled to said broker module and said handler applications for buffering signal transmissions therebetween.

12. A network based diagnosis server as claimed in claim 1, wherein said diagnosis server comprises at least one networked computer.

13. A network-based diagnosis server for monitoring and diagnosing a system having multiple components, said diagnosis server being remote from the system it is observing and comprising:

at least one sensor for monitoring and generating signals indicative of at least one characteristic of a component of the system;

at least one sensor agent coupled to said sensor for receiving signals from said sensor;

an interface connecting said sensor agent to said network;

a broker module coupled to said network for sending signals to and receiving signals from said sensor agent;

at least one RT-Agent application initiated by and connected to said broker module for transmitting signals to and receiving signals from said broker module;

at least one TEAMS-RT reasoner application in communication with and invocable by said RT-Agent application for processing, and responding to signals received from said RT-Agent application;

said sensor agent, said broker module, said RT-Agent application, and said TEAMS-RT reasoner application operate simultaneously relative to each other;

said broker module being independent of said RT-Agent application and said TEAMS-RT reasoner application such that said diagnosis server is readily adaptable to various systems; and wherein said diagnosis server performs continuous monitoring and diagnosing of said components of the system.

14. A network-based diagnosis server as defined in claim 13 further comprising at least one TEAMATE reasoner application in communication with and invocable by said RT-Agent application for user controlled processing, and responding to signals received from said RT-Agent application.

15. A network-based diagnosis server as defined in claim 14 further comprising at least one Supervisor TEAMS-RT reasoner application in communication globally with said TEAMS-RT reasoner application, said TEAMATE reasoner application, said RT-Agent application, said sensor agent and said broker module wherein, said Supervisor TEAMS-RT reasoner manages said TEAMS-RT reasoner and said TEAMATE reasoner applications.

16. A network-based diagnosis server as defined in claim 14, wherein said component of the system comprises a controller in communication with said signal agent, wherein said signal agent transmits signals thereto for controlling said component of the system.

17. A network-based diagnosis server as defined in claim 16 further comprising at least one TEAMS-KB diagnostic database for processing, diagnosing, and modeling signals, wherein said TEAMS-KB database is coupled to each of said RT-Agent application, said TEAMS-RT reasoner application, and said TEAMATE reasoner application and said Supervisor TEAMS-RT reasoner application, such that each said application can transmit signals to and receive signals from said TEAMS-KB diagnostic database.

18. A network-based diagnosis server as defined in claim 17 further comprising a database accessible to said Supervisor TEAMS-RT reasoner application and said TEAMS-KB diagnostic database for storage of information specific to the system.

19. A network-based diagnosis server as defined in claim 13, wherein said sensor agent periodically transmits signals to said broker module for subsequent processing by said TEAMS-RT reasoner application such that said diagnosis server operates in real-time.

20. The diagnosis server as claimed in claim 13, further comprising shared memory allocated by said broker module and coupled to broker module and said RT-Agent handler applications for buffering transmission of signals therebetween.

21. The diagnosis server as claimed in claim 13, wherein said diagnosis server comprises at least one networked computer.

* * * * *